(12) United States Patent
Fong

(10) Patent No.: US 7,946,719 B2
(45) Date of Patent: May 24, 2011

(54) PHOTOGRAPHIC LIGHT DIFFUSER

(75) Inventor: Gary M. Fong, Marina del Rey, CA (US)

(73) Assignee: Gary Fong Photographic, Inc., Kelowna BC (CA)

( * ) Notice: Subject to any disclaimer, the term of this patent is extended or adjusted under 35 U.S.C. 154(b) by 301 days.

(21) Appl. No.: 11/055,934

(22) Filed: Feb. 11, 2005

(65) Prior Publication Data
US 2006/0109640 A1    May 25, 2006

Related U.S. Application Data

(60) Provisional application No. 60/630,637, filed on Nov. 24, 2004.

(51) Int. Cl.
*G03B 15/02* (2006.01)

(52) U.S. Cl. ............... 362/16; 362/17; 362/18

(58) Field of Classification Search .......... 362/11, 362/16–18, 305, 319, 320, 329, 340, 353, 362/355, 361; 396/155, 173
See application file for complete search history.

(56) References Cited

U.S. PATENT DOCUMENTS

| | | | |
|---|---|---|---|
| 756,194 A | 3/1904 | Zalinski | |
| 1,769,993 A | 7/1930 | Gillinder | |
| 1,874,086 A | 8/1932 | Dickson | |
| 2,235,864 A | 3/1941 | Brennan et al. | |
| 2,747,076 A * | 5/1956 | Eloranta | 362/10 |
| 2,879,377 A * | 3/1959 | Layng | 362/17 |
| 3,191,022 A | 6/1965 | Wince | |
| 3,855,602 A | 12/1974 | Hoos | |
| 4,066,885 A | 1/1978 | Weinberg | |
| 4,075,472 A * | 2/1978 | Higuchi | 362/255 |
| 4,084,168 A | 4/1978 | Pizzuti et al. | |
| 4,091,402 A | 5/1978 | Siegel | |
| 4,091,444 A | 5/1978 | Mori | |
| 4,109,301 A * | 8/1978 | Wakimura | 362/7 |
| 4,146,918 A | 3/1979 | Tureck | |
| 4,175,279 A * | 11/1979 | Asaki | 362/18 |

(Continued)

FOREIGN PATENT DOCUMENTS

JP             10260457 A  *  9/1998

OTHER PUBLICATIONS

Product Pamphlet: Stroboframe Flash Brackets and accessories; © 1992; 16 sheets.

(Continued)

*Primary Examiner* — Hargobind S Sawhney
(74) *Attorney, Agent, or Firm* — Christie, Parker & Hale, LLP

(57) ABSTRACT

A photographic light diffusing device comprises a semi-transparent cowl which is adapted to be mounted on a photographic light source, the cowl including an opening through which the photographic light source is visible when the cowl is mounted thereon, and a removable semi-transparent cover detachably mounted on the cowl. In another embodiment, a camera flash system comprises a camera flash unit, and a diffuser unit having an adaptor and a tapered cylindrical body. The adaptor is formed to match the shape of the housing of the camera flash unit so that it may be fitted thereto, and the adaptor extends between the camera flash unit and the tapered cylindrical body of the diffuser unit. The diffuser unit widens from the adaptor to meet the tapered cylindrical body.

17 Claims, 8 Drawing Sheets

U.S. PATENT DOCUMENTS

| | | | |
|---|---|---|---|
| 4,190,880 A * | 2/1980 | Esaki | 362/18 |
| 4,251,854 A | 2/1981 | Kaneko et al. | |
| 4,276,579 A * | 6/1981 | Yako | 362/5 |
| 4,333,127 A * | 6/1982 | Alkema et al. | 362/17 |
| 4,446,506 A | 5/1984 | Larson | |
| 4,479,173 A | 10/1984 | Rumpakis | |
| 4,539,624 A * | 9/1985 | Stone | 362/17 |
| 4,562,521 A | 12/1985 | Noguchi | |
| 4,594,645 A * | 6/1986 | Terashita | 362/18 |
| 4,610,525 A * | 9/1986 | Yoshida et al. | 396/157 |
| 4,633,374 A | 12/1986 | Waltz et al. | |
| 4,669,031 A * | 5/1987 | Regester | 361/16 |
| 4,710,012 A * | 12/1987 | Yamada | 396/157 |
| 4,757,425 A | 7/1988 | Waltz | |
| 4,807,089 A * | 2/1989 | Nussli | 362/17 |
| 5,095,325 A | 3/1992 | Carstens | |
| 5,154,503 A | 10/1992 | Sternsher | |
| 5,311,409 A | 5/1994 | King | |
| 5,556,186 A | 9/1996 | Pilby | |
| 5,560,707 A | 10/1996 | Neer | |
| 5,839,006 A | 11/1998 | Beckerman | |
| 6,010,234 A * | 1/2000 | Rahn | 362/320 |
| 6,059,421 A * | 5/2000 | White et al. | 362/97 |
| 6,361,192 B1 | 3/2002 | Fussell et al. | |
| 6,502,962 B1 | 1/2003 | Menke et al. | |
| 6,709,121 B1 * | 3/2004 | Lowe et al. | 362/18 |
| 6,981,785 B1 | 1/2006 | Watchulonis | |

OTHER PUBLICATIONS

Magazine Article: Stint, S., "Stint's View", Popular Photography, Feb. 1996, 3 sheets.

Author Unknown, Sto-Fen Products: Bounce Flash Specialists, http://web.archive.org/web/20050211002726/http://www.stofen.com/, website publication Feb. 11, 2005, last updated Jan. 28, 2005, Copyright 1999-2005, 2 pages, Sto-Fen Products, Santa Cruz, California.

Couch, The World Leader in Flash Accessories for Digital & Film, http://web.archive.org/web/20050210100311/http://www.lumiquest.com/, website publication Feb. 10, 2005, © 2004 LumiQuest, 2 pages, LumiQuest, New Braunfels, Texas.

* cited by examiner

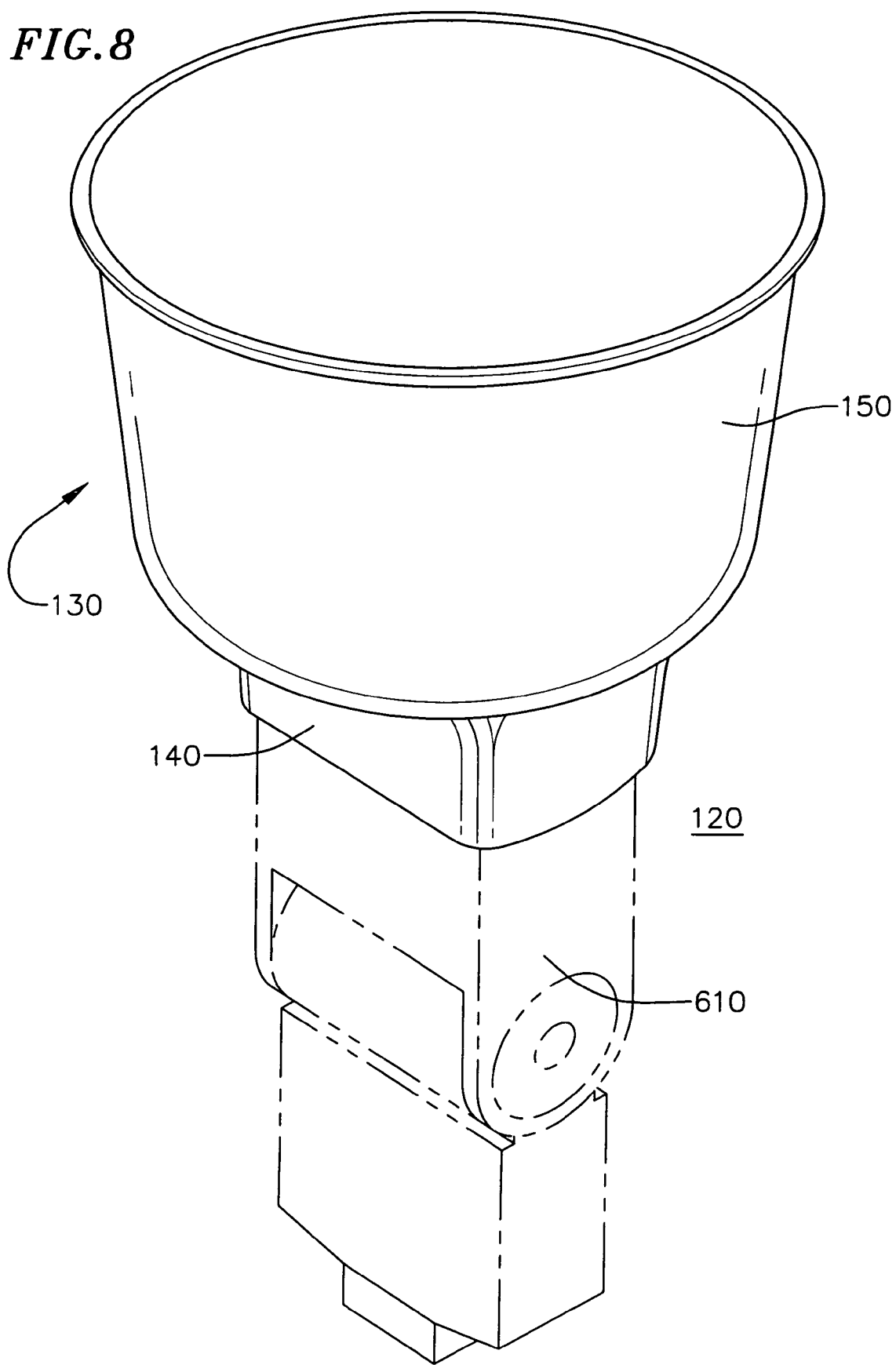

PHOTOGRAPHIC LIGHT DIFFUSER

The present application claims the benefit of Provisional U.S. Patent Application No. 60/630,637 filed Nov. 24, 2004.

FIELD OF THE INVENTION

The present invention relates to photographic light diffusers and more particularly to portable light diffusers having compound geometry and separable components.

BACKGROUND

Diffuse lighting accessories are photography devices commonly used to provide soft lighting effects in photographs. To achieve a diffuse lighting effect, light can be either directly or indirectly passed through a semi-transparent material, or it may be reflected off a material which will cause it to scatter somewhat. Such diffuse lighting is commonly produced by light sources which are remote from the camera. Typically, such light diffusers are provided by stationary screens, umbrellas, soft boxes and the like. Such devices provide excellent lighting effects in fixed studio settings where there is no need to transport the lighting equipment including the diffusers from place to place.

Each particular shot to be lighted dictates the type and intensity of light needed to properly illuminate the subject. In some situations direct light from a light source without any alteration may be required. In other situations direct lighting may be too strong or cast overly distinct shadows, in which case a more diffuse light is desirable. In still other cases, an even more indirect diffuse light may be needed to create the proper lighting effect. It is important to have a certain amount of uniformity in the lighting used to illuminate the subject. This uniformity may be achieved using typical stationary diffusers provided that the equipment is of good quality and is employed in the proper fashion.

While the equipment described above provides good lighting effects in a fixed studio setting, it can be inconvenient if not impossible to use such stationary lighting accessories outside of the photography studio. For shoots which require the photographer to be mobile, especially shoots where the photographer must capture action shots or cannot otherwise pose his subject, a small portable diffuser may be used which attaches directly to the camera itself. Such a light diffuser may be placed directly over an on-camera flash to provide a semi-transparent barrier to clear light transmission. Known diffusers exist which are small and portable with the camera and flash itself, and these diffusers are used by photographers in shoots where it is impractical to employ fixed lighting equipment. However, known portable diffusers for use with on-camera flashes are less than ideal in terms of the quality of lighting produced. These diffusers tend to create hotspots and may also leave noticeable, undesirable shadows.

SUMMARY OF THE INVENTION

In an exemplary embodiment, a photographic light diffuser is provided made from a homopolymer polypropylene. In a further embodiment, the homopolymer polypropylene may be employed in its natural, translucent color. The photographic light diffuser may be mounted directly to the head of an on-camera flash unit. The diffuser has a tapered cylindrical body which produces a soft, highly diffused and flattering light quality. The diffuser also includes a rectangular base with a flat surface to add an amount of specular or focused light. Because of the tapered cylindrical shape of the body of the diffuser, regardless of whether shots are taken in the vertical or horizontal position or under high or low ceilings the diffuser produces the same soft, flattering light quality. The present diffuser allows a photographer to achieve studio-quality lighting and greatly minimize shadows while providing a desirable light balance. In an alternative embodiment, the diffuser is provided with a removable dome which helps to diffuse light even further, especially in environments with low ceilings. Because the dome is removable, it allows one to easily shoot "flash direct" without needing to first remove the cowl that comprises the base of the diffuser.

In another exemplary embodiment, a photographic light diffuser comprises a semi-transparent cowl which is adapted to be mounted on a photographic light source, the cowl including an opening through which the photographic light source is visible when the cowl is mounted thereon, and a removable semi-transparent cover detachably mounted on the cowl.

In an alternative embodiment, a photographic light diffuser which is adapted to be mounted on a photographic light source comprises a base of a shape adapted to be mounted on a light source, a body extending from the base having both a generally convex outer surface as well as a smaller flat portion, and a cover connected to the body.

In yet another embodiment, a camera flash system comprises a camera flash unit, and a diffuser unit having an adaptor and a tapered cylindrical body. The adaptor is formed to match the shape of the housing of the camera flash unit so that it may be fitted thereto, and the adaptor extends between the camera flash unit and the tapered cylindrical body of the diffuser unit. The diffuser unit widens from the adaptor to meet the tapered cylindrical body.

BRIEF DESCRIPTION OF THE DRAWINGS

FIG. 8 shows a perspective view of a diffuser in use atop a flash head.

Figure 1:
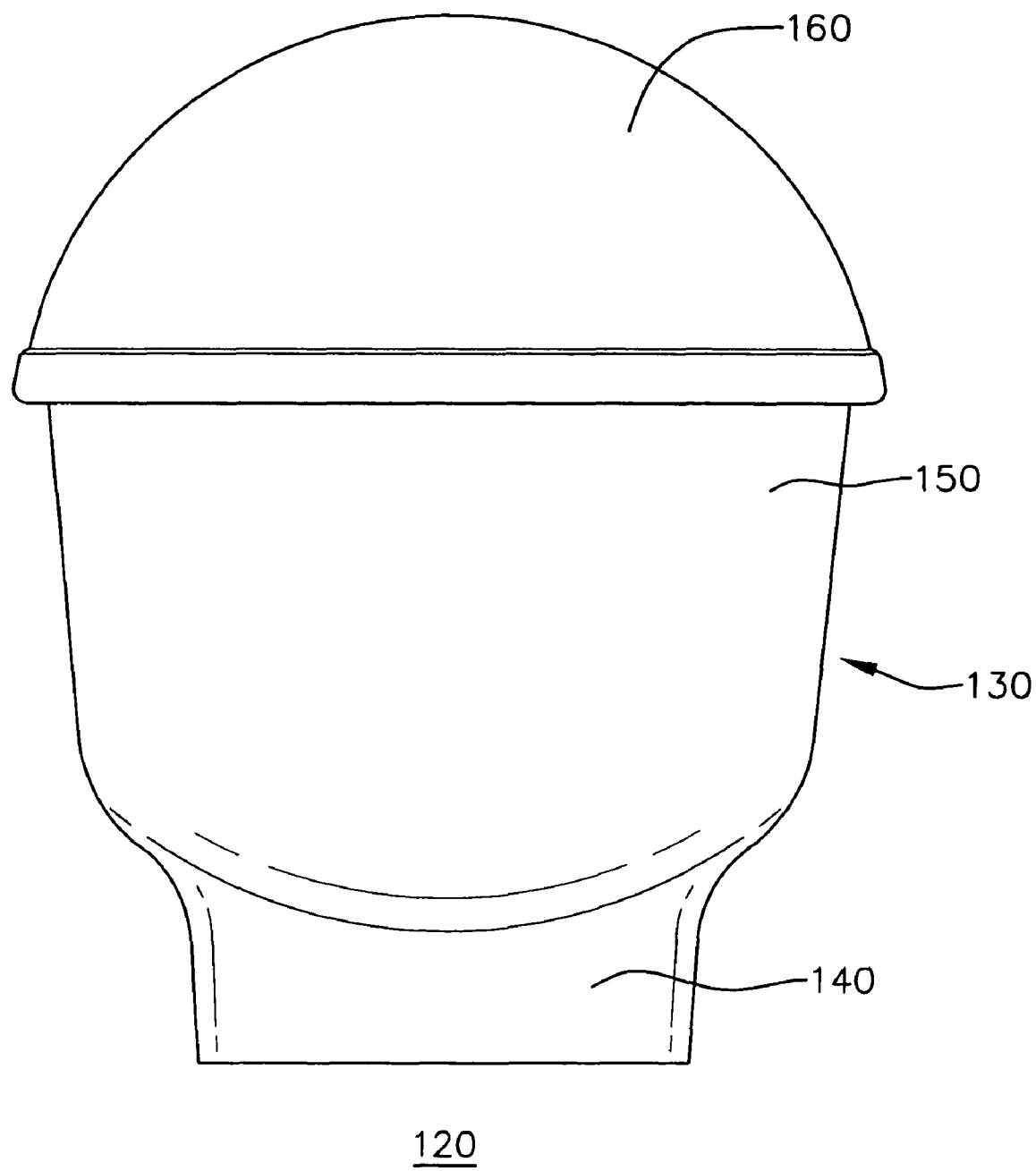
FIG. 1 shows a front view of a photographic light diffuser according to one embodiment of the present invention.

Before any embodiment of the invention is explained in detail, it is to be understood that the invention is not limited in its application to the details of construction and arrangements of components set forth in the following description, or illustrated in the drawings. The invention is capable of alternative embodiments and of being practiced or being carried out in various ways. Also, it is to be understood that the terminology used herein is for the purpose of illustrative description and should not be regarded as limiting.

DETAILED DESCRIPTION

The present photographic flash diffuser provides high quality lighting effects when used with on-camera flashes, allowing photographers to achieve studio-quality lighting using electronic on-camera flashes without the need for separate lighting equipment. By doing so, the present diffuser does away with needing to carry around and use cumbersome lighting equipment such as brackets, umbrellas, soft boxes and the like, allowing for truly mobile, spontaneous photography.

FIG. 1 shows a front view of a photographic light diffuser 120 according to one embodiment of the present invention. This diffuser 120 may in one exemplary embodiment be formed from plastics using a vacuum molding process. It may also be made from other molding and non-molding plastic forming processes, as well as being formed from other appropriate semi-transparent or translucent materials as will be understood by one skilled in the art. The mold surface may be roughened to provide the diffuser 120 with a semi-transparent or translucent finish. This roughened surface may be created by treating the mold with a sand or bead blasting process. In one embodiment, the diffuser 120 may be formed having two separable parts. However, in an alternative embodiment, the diffuser 120 may be formed as a single piece having roughly the same overall shape as the embodiments shown.

As shown in the embodiment of FIG. 1, the diffuser 120 is provided having two component parts; a cowl 130 and a removable dome 160. The cowl 130 is provided with a generally rectangular base 140 allowing it to attach directly to the head of an on-camera flash unit. In one embodiment, the generally rectangular base 140 may be friction fitted to the head of the on-camera flash unit. In alternative embodiments, the generally rectangular base 140 of the diffuser 120 may be mounted on the flash unit using a bracket permanently or removably attached to the flash unit, or it may be mounted using a threaded collar, a bayonet style mount, using velcro, or by other appropriate methods known to those skilled in the art.

Figure 2:
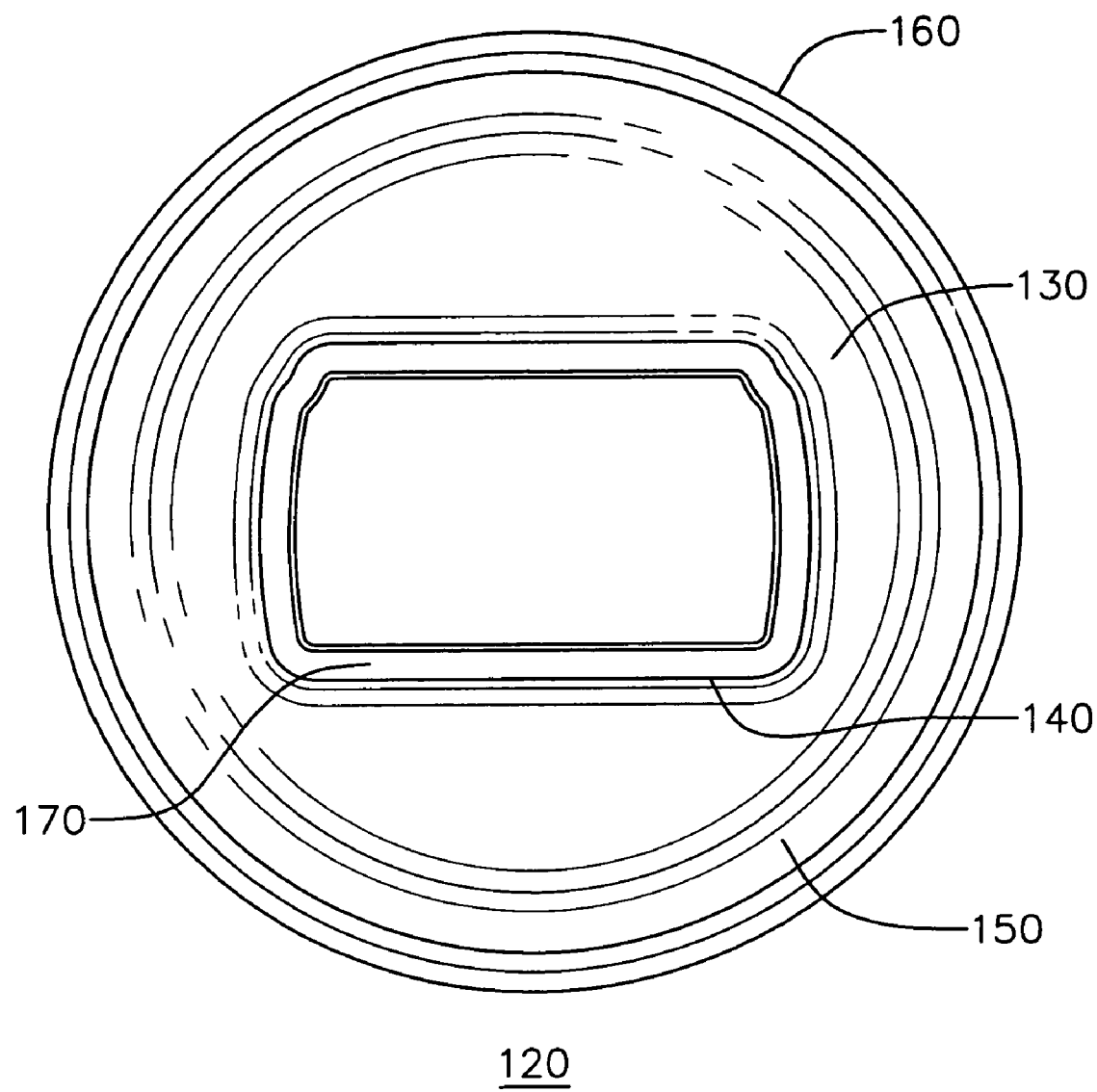
FIG. 2 shows a bottom view of the photographic light diffuser of FIG. 1.

FIG. 2 shows a bottom view of the photographic light diffuser 120 of FIG. 1. FIG. 2 illustrates that the generally rectangular base 140 of the present diffuser 120 may be provided with a basal socket 170 of specific interior dimensions in order to match the exterior dimensions of standard camera flashes. This particular embodiment of a basal socket is designed to be friction fit to a Nikon SB-800 Speedlight flash unit. Other basal sockets may be configured for a friction fit with other models of camera flash units.

Figure 3:
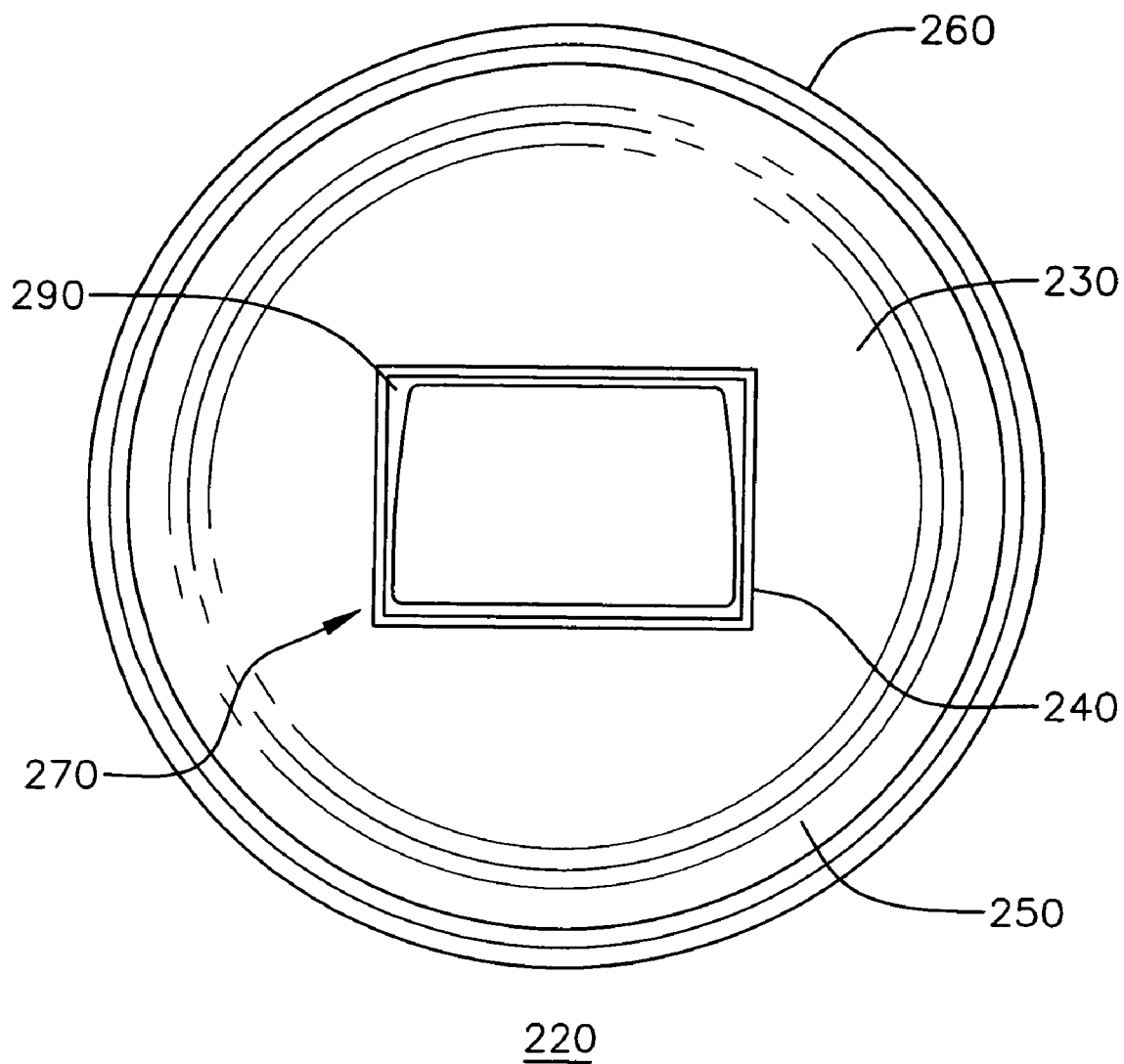
FIG. 3 shows a bottom view of an alternative embodiment of a photographic light diffuser.

In yet another embodiment, FIG. 3 shows a bottom view of a photographic light diffuser with a generally rectangular base 240 that differs in size from the generally rectangular base 140 of the diffuser 120 shown in FIG. 2. In this embodiment, the basal socket 270 of the diffuser 220 is of a predetermined size to accept any one of a number of different adaptors 290, and it is the adaptor 290, rather than the basal socket 270, which sized to fit the exterior dimensions of the desired camera flash. The adaptor 290 may be a gasket-style adapter made from a flexible material to fit various flash units from different manufacturers, or it may be made from a stiffer material and designed to fit a single flash unit. The use of a diffuser with a "universal-mount" base of this embodiment permits a single diffuser to be used with various different flash units of widely different shapes by use of different adaptors.

Returning to the diffuser 120 of FIG. 2, in an exemplary embodiment the base 140 extends past a minimum length of about one half inch to permit the base to fit over a flash unit, as well as to provide a generally rectangular base 140 between the flash unit itself and the body of cowl 130 of the diffuser 120 through which light from the flash travels. This relatively small generally rectangular base 140 adds an amount of direct or specular lighting to the flash effect created by the diffuser 120. This effect is caused by the close proximity of the walls of the diffuser 120 in the area of the generally rectangular base 140 to the flash itself, causing light to be refracted through this area of the diffuser 120 with a greater intensity than through the tapered cylindrical body 150 of the diffuser 120.

Accordingly, the lighting properties of the diffuser 120 can be varied by varying the relative proportions of the diffuser 120, specifically the length and breadth of the passage through the generally rectangular base 140 with respect to the size of the tapered cylindrical body 150 of the diffuser 120. A shorter passage and a larger tapered cylindrical body would cause the diffuser 120 to provide less of a direct and more of a diffused lighting effect. Conversely, a relatively longer passage and smaller tapered cylindrical body would affect the balance of the lighting effect created by the diffuser 120 in the opposite manner.

While the purpose the of the diffuser 120 is to ameliorate the harsh effects of direct lighting, some amount of direct light, or "key light" is desirable to provide an amount of specularity in an exposed image. The higher intensity gives a catchlight to the eyes of photographic subjects and prevents the image from appearing too soft. The compound geometry in the present diffuser 120 is designed to strike a balance between an image that is too harsh and one that is too soft.

Figure 4:
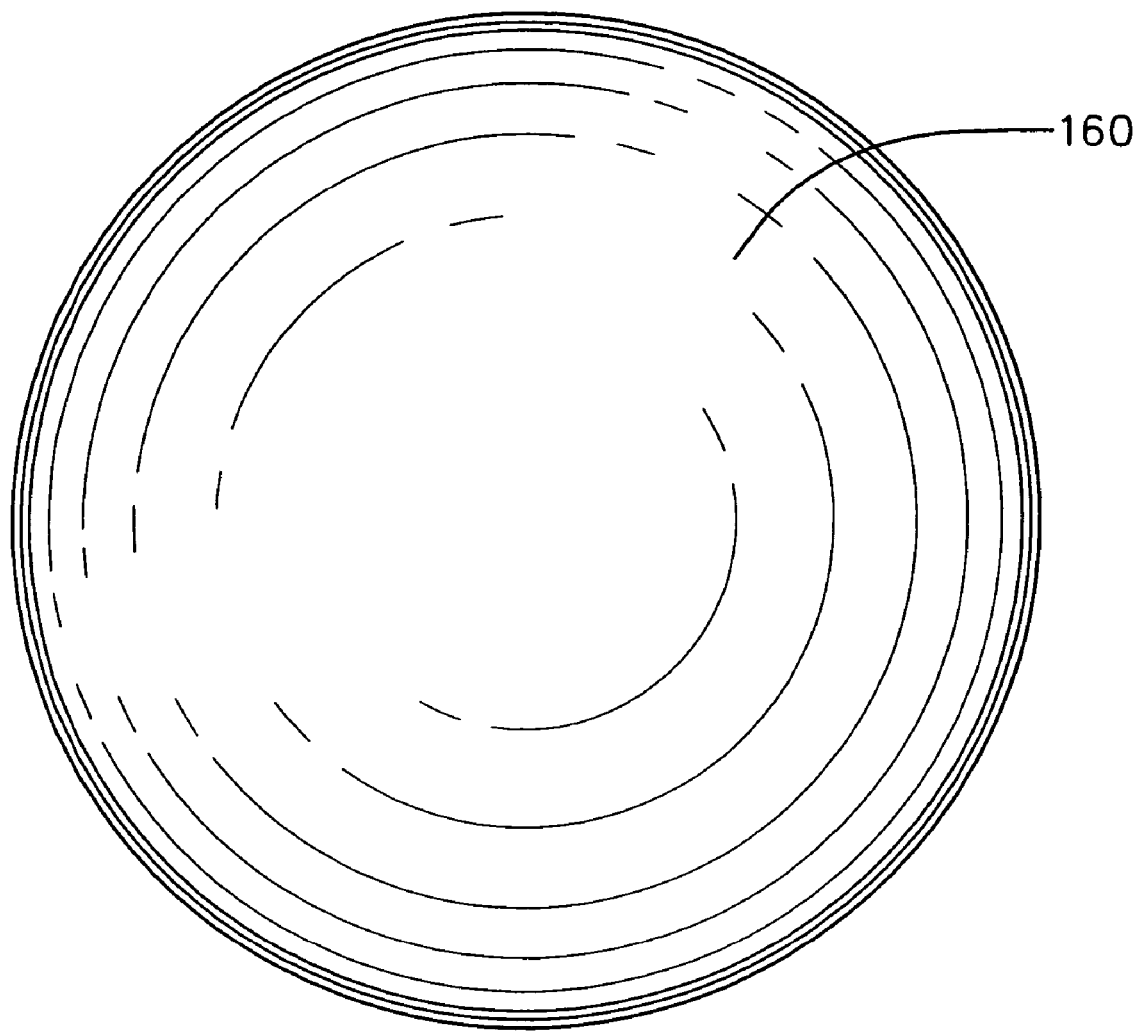
FIG. 4 shows a top view of the photographic light diffuser of FIG. 1.
Figure 5:
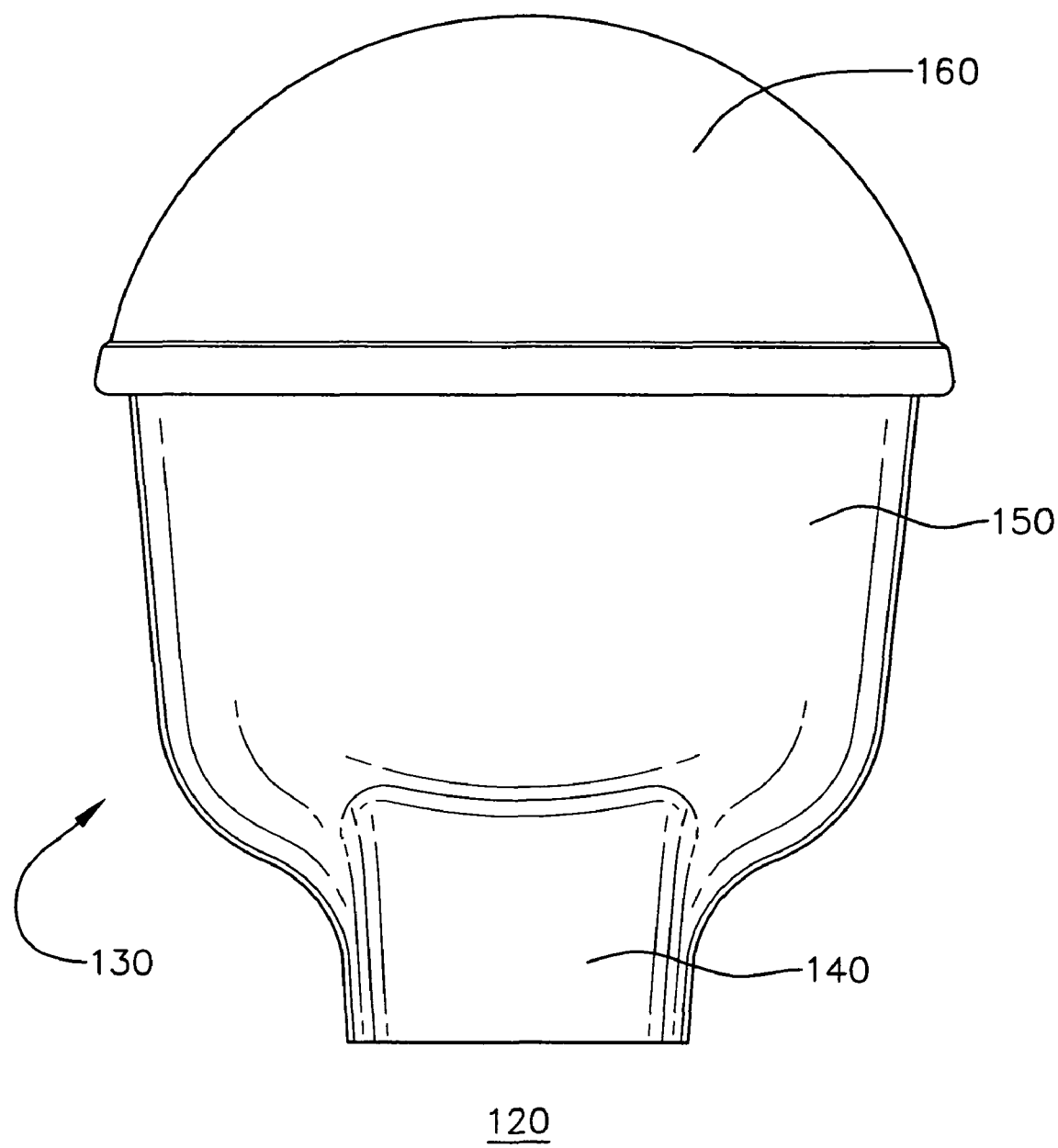
FIG. 5 shows a side view of the photographic light diffuser of FIG. 1.
Figure 7:
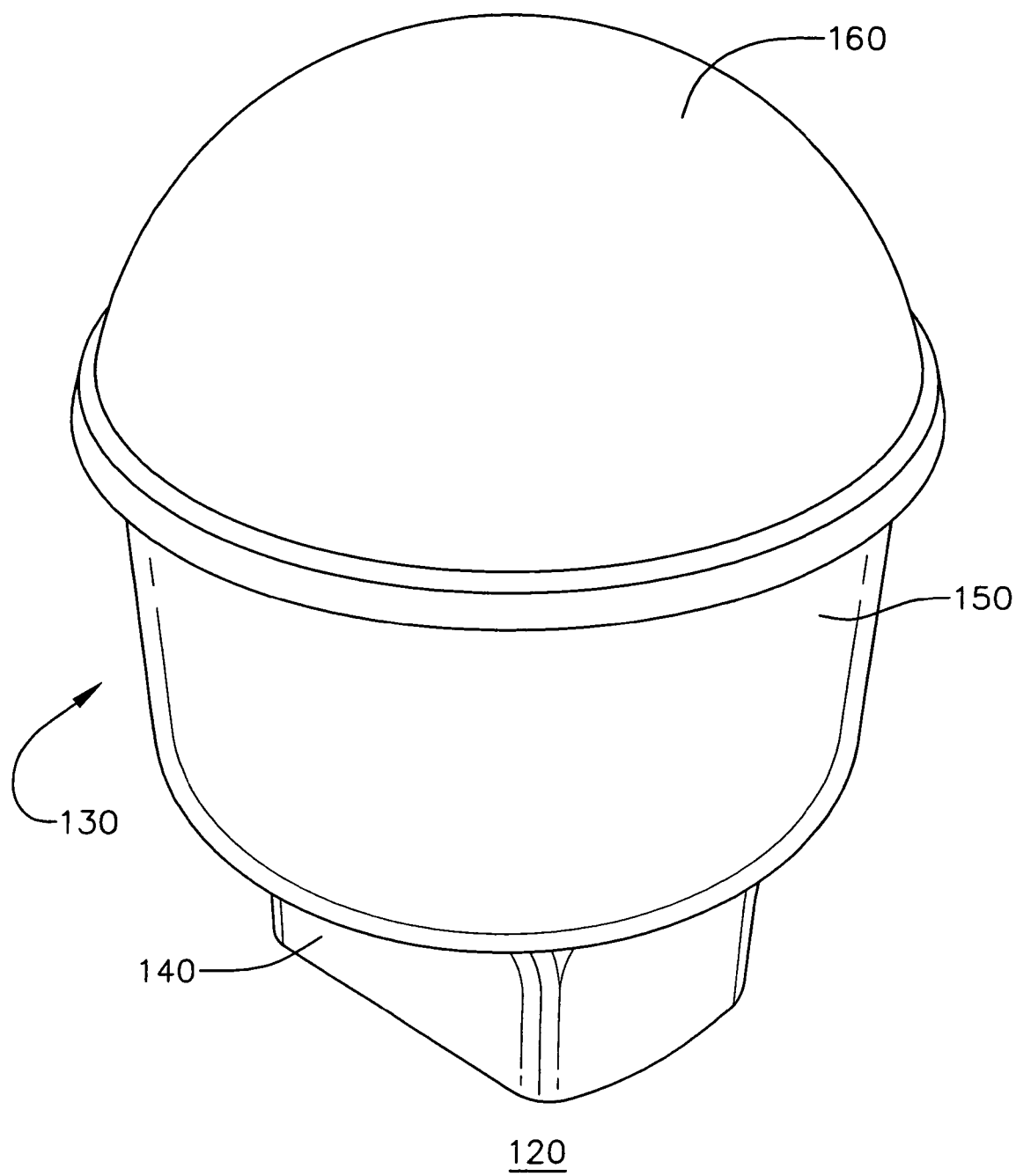
FIG. 7 shows a perspective view of the photographic light diffuser of FIG. 1.

As shown in FIG. 1, and again in profile in FIG. 5, the rectangular base of the diffuser 120 melds seamlessly into the tapered cylindrical body 150, which helps to reduce hot spots and smoothly transitions the light distribution of the diffuser 120 from the more direct light of the rectangular base to the more diffuse light provided by the tapered cylindrical body 150. The side view of the diffuser 120 of FIG. 5 also shows a cowl 130 of which the tapered cylindrical body 150 is a part, as is the generally rectangular base 140. To this cowl 130 is connected the removable dome 160. In contrast, FIG. 4 shows a top view of a photographic light diffuser 120 having a dome 160. Finally, FIG. 7 shows a perspective view of a photographic light diffuser 120 according to one embodiment of the present invention having a cowl 130 comprising a generally rectangular base 140 and a tapered cylindrical body 150, and a dome 160 attached thereto.

Returning now to FIG. 1, an exemplary embodiment of the present diffuser 120 is shown wherein the tapered cylindrical body 150 is radially symmetric with respect to an axis extending along the direction of the flash unit on which the diffuser 120 is mounted. In this embodiment, the tapered cylindrical body 150 of the diffuser 120 is slightly tapered, flaring out as it extends away from the rectangular base. This tapered shape, while not required, helps to further reduce the hot spots which would otherwise occur as the light energy from the flash strikes the nearer parts of the tapered cylindrical body 150 with greater intensity than the farther, reducing the diffuse effect otherwise created by the tapered cylindrical body 150. While some direct lighting effect is desired as discussed above, it can be provided more evenly and reliably by the generally rectangular base 140, and as such it is desirable in the embodiment shown to emphasize the diffuse lighting function of the tapered cylindrical body 150 at the expense of the direct lighting function by providing this taper. With the present diffuser 120, the softness of the lighting effect produced comes as much if not more so from the shape of the diffuser 120 itself and especially the manner in which light is evenly refracted through the surface of the tapered cylindrical body 150 as from the dispersal of light around the room, including light reflected by the walls and ceilings.

In one embodiment, the tapered cylindrical body 150 of the diffuser 120 allows it to provide similar lighting effects when used in either the vertical or horizontal positions, regardless of its orientation. Accordingly, unlike prior art diffusers, no flash bracket is needed with the present diffuser 120 to keep the flash in an upright position during both vertical and horizontal photography. In alternative embodiments, the tapered cylindrical body 150 of the diffuser 120 may form an ellipse in cross section, or one of a set of n-sided polygons. In still other embodiments, the tapered cylindrical body 150 may be longer or shorter than is shown in the figures, or may be of a cylindrical or other shape such as a non-tapered shape. In one embodiment, the height and width of the diffuser are about equal to one another. In another embodiment, the diffuser is generally spherical in shape. In yet another embodiment, the diffuser is proportioned so that it is easy to pack and transport in that it may be placed over the camera's lens when packed together with a camera in a standard camera/gadget bags, thus saving space. For example, the cowl 130 of the diffuser 120 may be placed directly over the lens of the camera, and the dome 160 may be placed in turn over the generally rectangular base 140 of the diffuser 120. In this way, the parts of the diffuser nest within each other in a compact arrangement.

In an exemplary embodiment, the present diffuser 120 is convertible for use with both low and high ceilings. To this end, FIG. 1 additionally shows the diffuser 120 provided with dome 160 which may be removably attached to the cowl 130 so that the diffuser 120 can be used to provide a more diffuse lighting effect with the dome 160 in place while easily converting for direct flash lighting by removing the dome 160.

When shooting with the diffuser in a vertical position in environments with high ceilings, the cowl 130 may be employed without the dome 160. In one embodiment, the cowl 130 is provided with an open top which lets light energy from the flash shine upwards to reflect off the ceiling in the absence of the dome 160. Due to the shape and orientation of the cowl 130, enough light strikes the sides of the tapered cylindrical body 150 of the cowl 130 to cast some amount of light forward onto the subject even without employing the removable dome 160. This gives a great lighting ratio for shots taken with the diffuser in the vertical position, reducing shadows on the subject and giving a diffuse, soft light all around the room as well as on the subject. For large group shots, the lighting quality is soft, beautiful and diffuse. The open top allows a great deal of light to bounce off the ceiling onto the subject yielding a beautiful, natural lighting effect.

Figure 6:
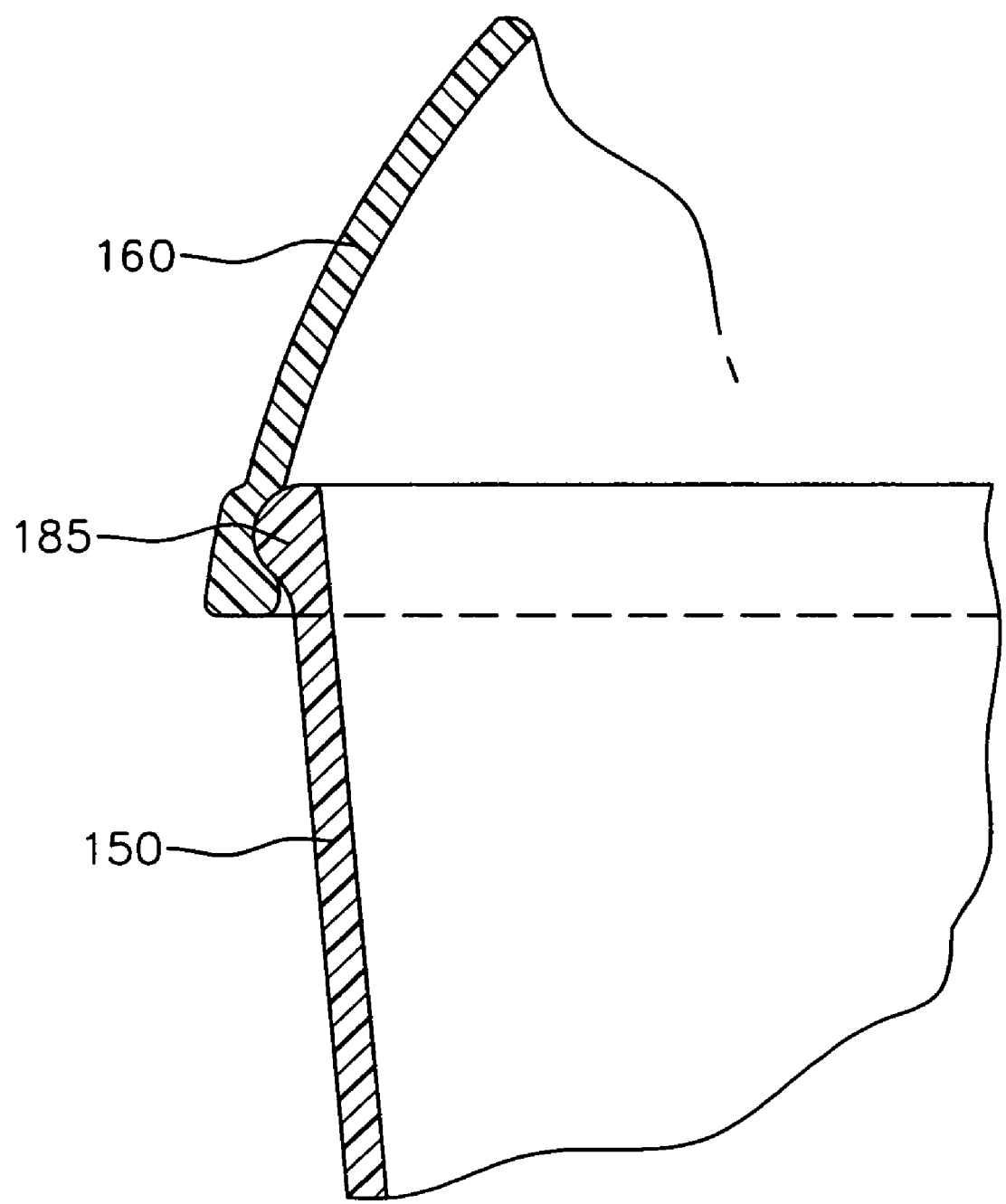
FIG. 6 shows a cross section of a photographic light diffuser according to one embodiment of the present invention.

The dome 160 is provided for indoor environments with low ceilings where reflected light from the ceiling would cast harsh shadows on the subject. In one embodiment, the dome 160 acts as a diffusion device to spread light evenly all around the room, lighting the subject as well as brightening dark backgrounds and ceilings. The dome 160 may snap directly onto the cowl 130 of the diffuser 120 to accomplish this diffusion. Specifically, FIG. 6 shows a cross section of a photographic light diffuser detailing one embodiment of a snap-on system for connecting the dome 160 to the tapered cylindrical body 150, wherein the former is provided with a recess which fits over a snap ridge 185 on the latter. Furthermore, the present combination of cowl 130 and dome 160 loses less power than other diffusers, making it more efficient. With the employment of the dome 160 with the diffuser 120 for use with low ceilings, studio-quality lighting using a flash can be achieved with a portable photography platform.

Additionally, when it is desirable to directly light a subject, it is not necessary to remove the entire diffuser 120 from the flash unit of the camera. The dome 160 only may be removed, and the flash pointed directly at the subject through the open top of the cowl 130 which remains attached to easily and directly illuminate the subject with no power loss.

On occasion, photographers will want the reflected light in their shots to have a particular color quality. This can be provided with alternative embodiments of the present diffuser wherein the material of the entire diffuser itself, or specific portions of the diffuser such as the cowl or the base are formed having a particular hue. For example, the dome 160 can be made amber for inside shots to provide warmer skin tones and for overall warming in flash filled available light shots, and green for shots where there is a good deal of florescent lighting.

FIG. 8 shows a perspective view of a diffuser 120 in use atop a flash unit 610. In the embodiment shown, the diffuser 120 is employed without the removable dome shown in the previous figures. The generally rectangular base 140 of the diffuser 120 is socketed over the head of the flash unit 610 so that the light emitted by the flash may be diffused by the components of the cowl 130 of the diffuser 120, specifically the generally rectangular base 140 and the tapered cylindrical body 150.

What is claimed is:

1. A photographic light diffusing device comprising:
   a semi-transparent cowl having a generally rectangular first end defined by side walls dimensioned to encompass and contact corresponding side walls of a photographic light source, the cowl outwardly tapering from the first end to a second end through which the photographic light source is visible when the cowl is mounted thereon, the second end having a peripheral edge, wherein a cross-sectional area of the second end is greater than a cross-sectional area of the generally rectangular first end; and
   a removable semi-transparent cover detachably mounted along the peripheral edge of the second end.

2. The photographic light diffusing device of claim 1, wherein the removable semi-transparent cover is of a dome shape.

3. The photographic light diffusing device of claim 1, wherein the semi-transparent cowl comprises a tapered portion.

4. The photographic light diffusing device of claim 1, wherein at least one of the semi-transparent cowl and the removable semi-transparent cover comprises vacuum molded plastic.

5. The photographic light diffusing device of claim 1, wherein the semi-transparent removable cover is tinted.

6. The photographic light diffusing device of claim 1, wherein the semi-transparent cowl is of a shape adapted to be friction fitted to the photographic light source.

7. The photographic light diffusing device of claim 1, further comprising a photographic light source, wherein the photographic light source is a camera flash.

8. A photographic light diffusing device which is adapted to be mounted on a photographic light source, the diffusing device comprising:
   a semi-transparent socket of a shape adapted to be mounted on a light source;
   a semi-transparent body comprising a rectangular base integral as a single piece with and extending from the socket and a generally convex outer surface integral as a single piece with and extending from the rectangular base, the generally convex outer surface having a peripheral edge, wherein the body and the socket comprise substantially the same material; and
   a removable cover connected along the peripheral edge of the generally convex outer surface.

9. The photographic light diffusing device of claim 8, further comprising an adaptor detachably mounted on the socket and the rectangular base, wherein the adaptor is formed to match a shape of a housing of a particular light source so that it may be fitted thereto.

10. The photographic light diffusing device of claim 8, wherein the socket is of a shape adapted to be friction fitted to a flash head.

11. The photographic light diffusing device of claim 8, further comprising an opening through which the photographic light source is visible when the photographic light diffusing device is mounted thereon.

12. The photographic light diffusing device of claim 8, wherein the body is cylindrical.

13. The photographic light diffusing device of claim 8, wherein the removable cover is of a dome shape.

14. The photographic light diffusing device of claim 13, wherein at least one of the body and the removable cover comprises vacuum molded plastic.

15. The photographic light diffusing device of claim 8, wherein the removable cover is tinted.

16. The photographic light diffusing device of claim 8, wherein the socket generally forms a quadrilateral in cross section.

17. The photographic light diffusing device of claim 8, wherein the removable cover has a convex shape.

* * * * *